United States Patent
Yang (10) Patent No.: US 10,302,875 B1
(45) Date of Patent: May 28, 2019

(54) OPTICAL FIBER ADAPTER

(71) Applicant: Muh-Chyng Yang, Kaohsiung (TW)

(72) Inventor: Muh-Chyng Yang, Kaohsiung (TW)

( * ) Notice: Subject to any disclaimer, the term of this patent is extended or adjusted under 35 U.S.C. 154(b) by 0 days.

(21) Appl. No.: 15/957,091

(22) Filed: Apr. 19, 2018

(30) Foreign Application Priority Data

Nov. 27, 2017 (CN) .......................... 2017 1 1201137

(51) Int. Cl.
*G02B 6/38* (2006.01)
(52) U.S. Cl.
CPC ......... *G02B 6/3874* (2013.01); *G02B 6/3825* (2013.01); *G02B 6/3893* (2013.01)
(58) Field of Classification Search
CPC ... G02B 6/3825; G02B 6/3874; G02B 6/3893
See application file for complete search history.

(56) References Cited

U.S. PATENT DOCUMENTS

| | | | | |
|---|---|---|---|---|
| 5,317,663 A | * | 5/1994 | Beard | G02B 6/3825 385/70 |
| 5,737,464 A | * | 4/1998 | Underwood | G02B 6/3825 385/58 |
| 5,838,855 A | | 11/1998 | Stephenson | |
| 5,937,121 A | * | 8/1999 | Ott | G02B 6/3825 385/59 |
| 6,347,888 B1 | * | 2/2002 | Puetz | G02B 6/3825 385/53 |
| 6,422,759 B1 | * | 7/2002 | Kevern | G02B 6/3825 385/58 |
| 6,471,414 B2 | * | 10/2002 | Carberry | G02B 6/3807 385/134 |
| 9,188,747 B2 | * | 11/2015 | Gniadek | G02B 6/3825 |
| 2002/0159712 A1 | * | 10/2002 | Holmquist | G02B 6/3825 385/70 |

FOREIGN PATENT DOCUMENTS

| | | |
|---|---|---|
| JP | 2005122086 A | 5/2005 |
| JP | 2008158489 A | 7/2008 |
| JP | 2010008992 A | 1/2010 |

* cited by examiner

*Primary Examiner* — Daniel Petkovsek
(74) *Attorney, Agent, or Firm* — Rosenberg, Klein & Lee (57) ABSTRACT

An optical fiber adapter includes an outer housing and an inner housing. A first alignment cylinder is formed in the outer housing for receiving a first optical fiber. The inner housing is integrally formed and disposed in the outer housing. The inner housing includes a plate, a pair of retaining clips, and a second alignment cylinder. The retaining clips extend from the front surface of the plate and the second alignment cylinder is disposed between the retaining clips and extends in a longitudinal direction from the front surface of the plate. The second alignment cylinder is formed with two slots extending through the second alignment cylinder from the outer surface to the inner surface. The two slots are oppositely disposed and extend to the rear surface of the plate in the longitudinal direction.

19 Claims, 6 Drawing Sheets

OPTICAL FIBER ADAPTER

RELATED APPLICATION

This application claims the priority benefit of Chinese Patent Application Number 201711201137.3, filed on Nov. 27, 2017, the full disclosure of which is incorporated herein by reference.

BACKGROUND

1. Technical Field

This disclosure generally relates to an optical fiber adapter, more particularly, to a one-piece optical fiber adapter.

2. Description of the Related Art

Recently, the use of fiber optics for communications purposes has grown immensely. Data, voice, and other communication networks are increasingly using fiber optics to carry information. An optical fiber is generally a glass fiber configured to carry light. Individual fibers may be grouped into a line capable of carrying large amounts of data simultaneously.

When constructing a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption. A typical connector includes two symmetrical housings, each housing having a connector latch. An alignment sleeve is placed within the connector latches to ensure the fibers are properly aligned. Then, the two housings are welded, riveted, or otherwise attached to each other, thereby forming a coupling. Individual optic fibers are then places within each connector latch, the alignment sleeve aligning the fibers.

This exemplary coupling is expensive to produce as numerous parts are required, and a welding, riveting or other attachment process must be done to connect the two symmetrical housings. Additionally, alignment issues may result from the attachment process as the two symmetrical housing components may shift during welding.

One approach to reduce the amount of components required is shown in U.S. Pat. No. 5,317,663, issued May 31, 1994 to Beard et al, the contents of which are incorporated herein by reference. In the above-identified patent, an adapter is taught which includes a single piece housing in which both connector latches are placed, along with an alignment sleeve, to provide an adapter. However, to place the components within the housing, a window is provided in the housing. A housing cover is provided which is welded to the housing to cover the window. While the design of the above-identified patent may eliminate any issues with alignment resulting from the attachment of the two housing components, it still requires numerous components and multiple assembly steps including welding the housing cover over the window.

SUMMARY

The present disclosure provides an optical fiber adapter. The optical fiber adapter of the present disclosure includes an outer housing and an inner housing. A first alignment cylinder is formed in the outer housing for receiving a first optical fiber. The inner housing is integrally formed and disposed in the outer housing. The inner housing includes a plate, a pair of retaining clips, and a second alignment cylinder. The retaining clips extend from the front surface of the plate and the second alignment cylinder is disposed between the retaining clips and extends in a longitudinal direction from the front surface of the plate. The second alignment cylinder is formed with two slots extending through the second alignment cylinder from the outer surface to the inner surface. The two slots are oppositely disposed and extend to the rear surface of the plate in the longitudinal direction.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE PREFERRED EMBODIMENT

Figure 1:
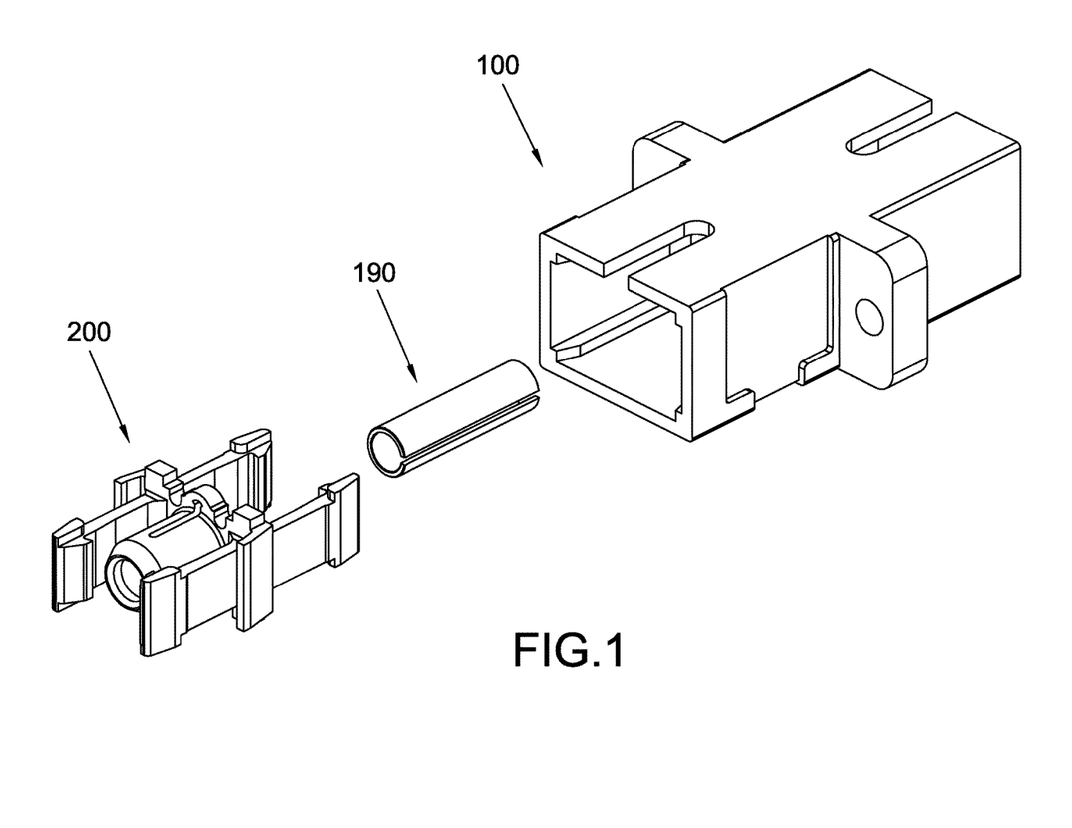
FIG. 1 is an exploded view of the optical fiber adapter of the present disclosure.
Figure 2:
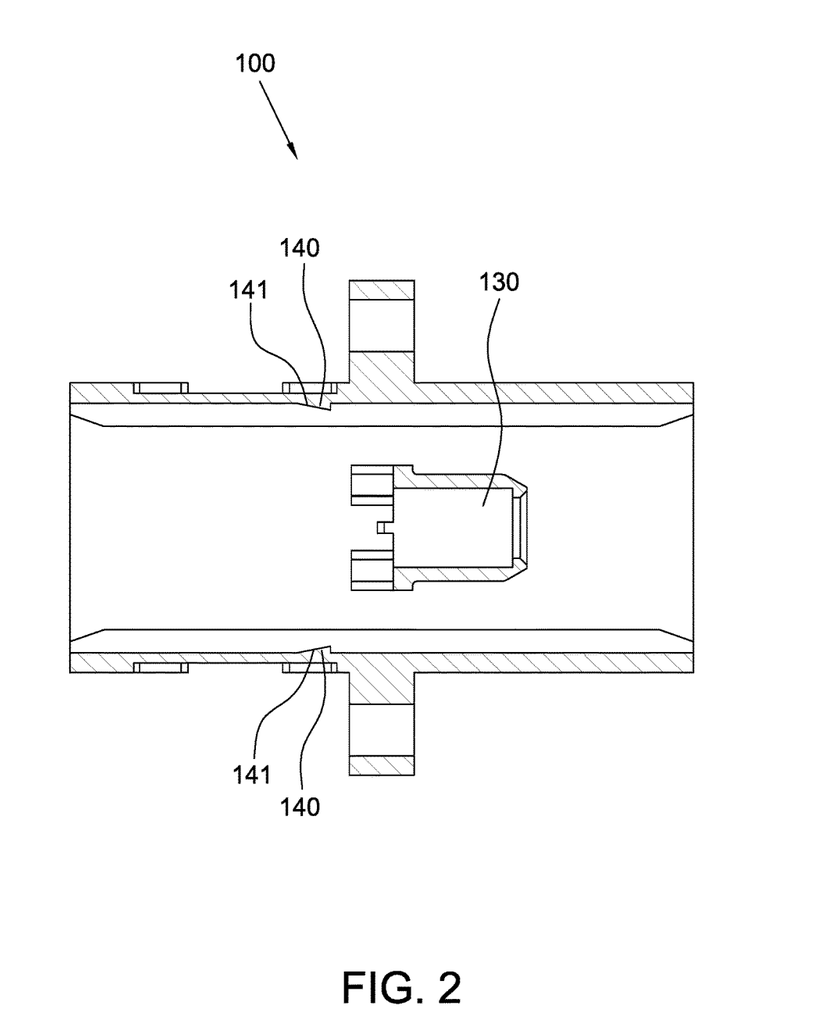
FIG. 2 is a cross-sectional view of the outer housing of the optical fiber adapter of the present disclosure.
Figure 3A:
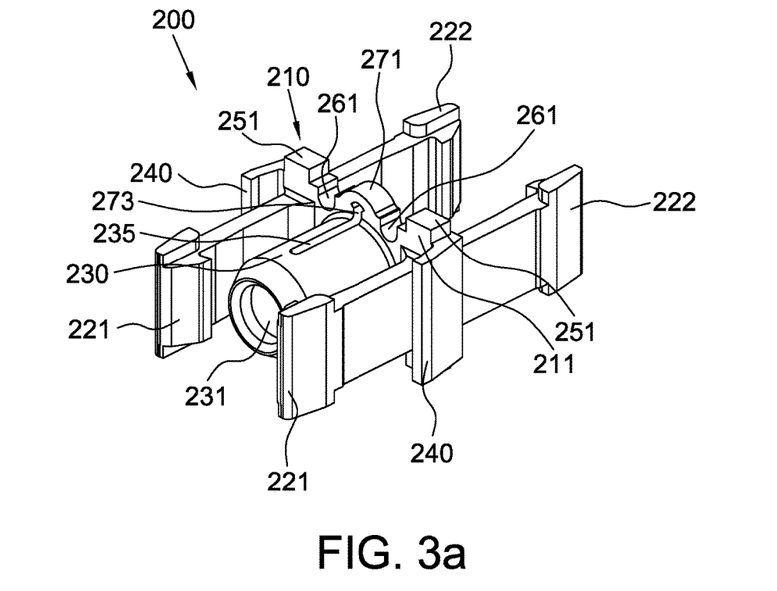
FIG. 3a is an elevated perspective view of the inner housing of the optical fiber adapter of the present disclosure.
Figure 3B:
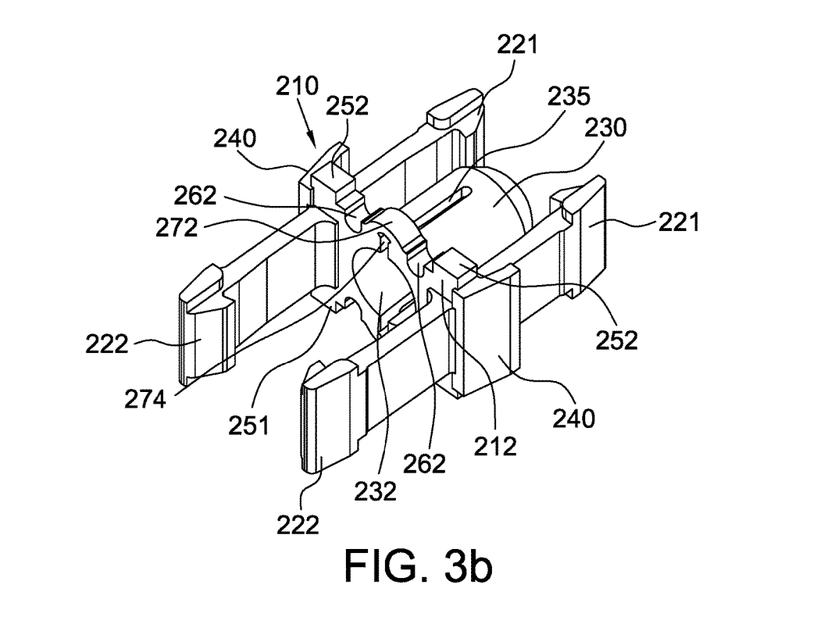
FIG. 3b is another elevated perspective view of the inner housing of the optical fiber adapter of the present disclosure.
Figure 3C:
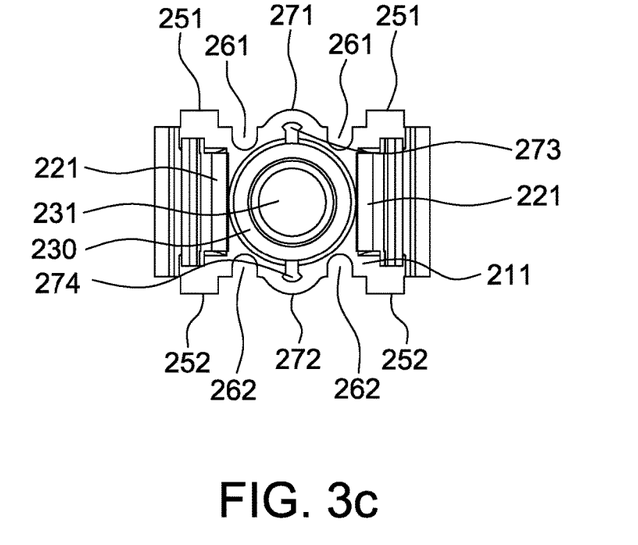
FIG. 3c is a front view of the inner housing of the optical fiber adapter of the present disclosure.
Figure 3D:
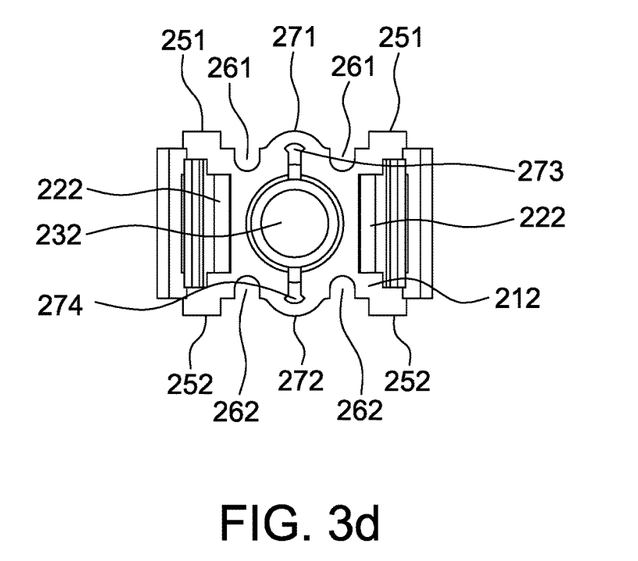
FIG. 3d is a rear view of the inner housing of the optical fiber adapter of the present disclosure.
Figure 3E:
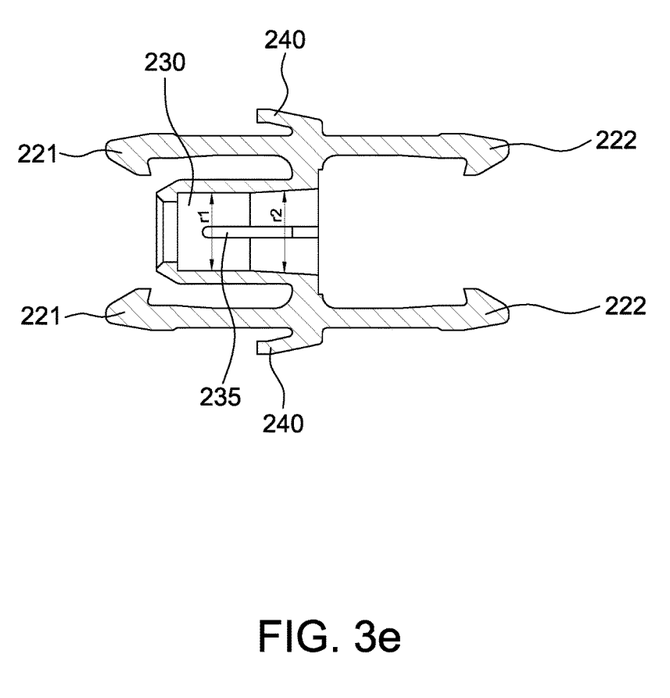
FIG. 3e is a cross-sectional view of the inner housing of the optical fiber adapter of the present disclosure.

Referring to FIG. 1, the optical fiber adapter of the present disclosure may be an SC type optical fiber adapter and includes an outer housing 100, a hollow alignment sleeve 190 and an inner housing 200. The outer housing 100 may be constructed of plastics by an injection molding process. Referring to FIGS. 1 and 2, the outer housing 100 is hollow and has a generally rectangular shape in cross section. A hollow alignment cylinder 130 is formed in the outer housing 100. The alignment cylinder 130 extends in a longitudinal direction and may be formed with the outer housing 100 in a single injection molding process. A half of the alignment sleeve 190 may be inserted into the alignment cylinder 130 from a rear end opening of the alignment cylinder 130. Further, one or more stop blocks 140 are disposed inside the outer housing 100, and each of the stop blocks 140 has an inclined surface 141 formed on an outer surface thereof.

The inner housing 200 may be constructed of plastics by an injection molding process. Referring to FIGS. 3a to 3e, the inner housing 200 includes a generally rectangular plate 210 having a front surface 211 and a back surface 212. Pairs of retaining clips 221 and 222 respectively extend from the front surface 211 and the back surface 212 of the plate 210. In addition, a hollow alignment cylinder 230 extends in the longitudinal direction from the front surface 211 of the plate 210, and the alignment cylinder 230 is disposed between the two retaining clips 221. Openings 231, 232 are respectively formed at the front and rear ends of the alignment cylinder 230, wherein the rear opening 232 is right located at the plate 210. The alignment cylinder 230 has a hollow circular cross-section in a transverse direction transverse to the longitudinal direction. The inner diameter of the alignment cylinder 230 is uniform at its front portion and suddenly becomes smaller near the front opening 231. The interior of the alignment cylinder 230 is tapered at its rear section, and gradually becomes larger toward the rear opening 232. The alignment cylinder 230 may define an inner diameter r1 at its front portion and an inner diameter r2 at its rear section r2, wherein r1 is smaller than r2. In addition, latching arms 240 respectively extend outwardly from two opposite sides of the plate 210. Two elongated pads 251 and two elongated pads 252 are respectively formed on the other two opposite sides of the plate 210. Two grooves 261 are formed within the side of the plate 210 between the two pads 251, and two grooves 262 are formed within the side of the plate 210 between the two pads 252. The grooves 261 and 262 are U-shaped grooves, and pass through the plate 210 from the front surface 211 to the back surface 212. Two slots 235 are formed within the alignment cylinder 230. The two slots 235 are symmetrical to each other and oppositely disposed in position within the alignment cylinder 230. The two slots 235 pass through the alignment cylinder 230 from its outer surface to inner surface, and extend longitudinally from the center of the front portion of the alignment cylinder 230 to the back surface 212 of the plate 210. The slots 235 have a uniform width ranged from 0.5 mm to 1.2 mm. In addition, an arched bridge 271 is formed on the side of the plate 210 between the two grooves 261. The bridge 271 extends over the end of one of the slots 235, and has a height that is less than the heights of the pads 251. A notch 273 is formed under the bridge 271 and is communicated to the slot 235 located under the bridge 271. An arched bridge 272 is formed on the side of the plate 210 between the two grooves 262. The bridge 272 extends over the end of the other slot 235, and has a height that is less than the heights of the pads 252. A notch 274 is formed under the bridge 272 and is communicated to the slot 235 located under the bridge 272.

Figure 4:
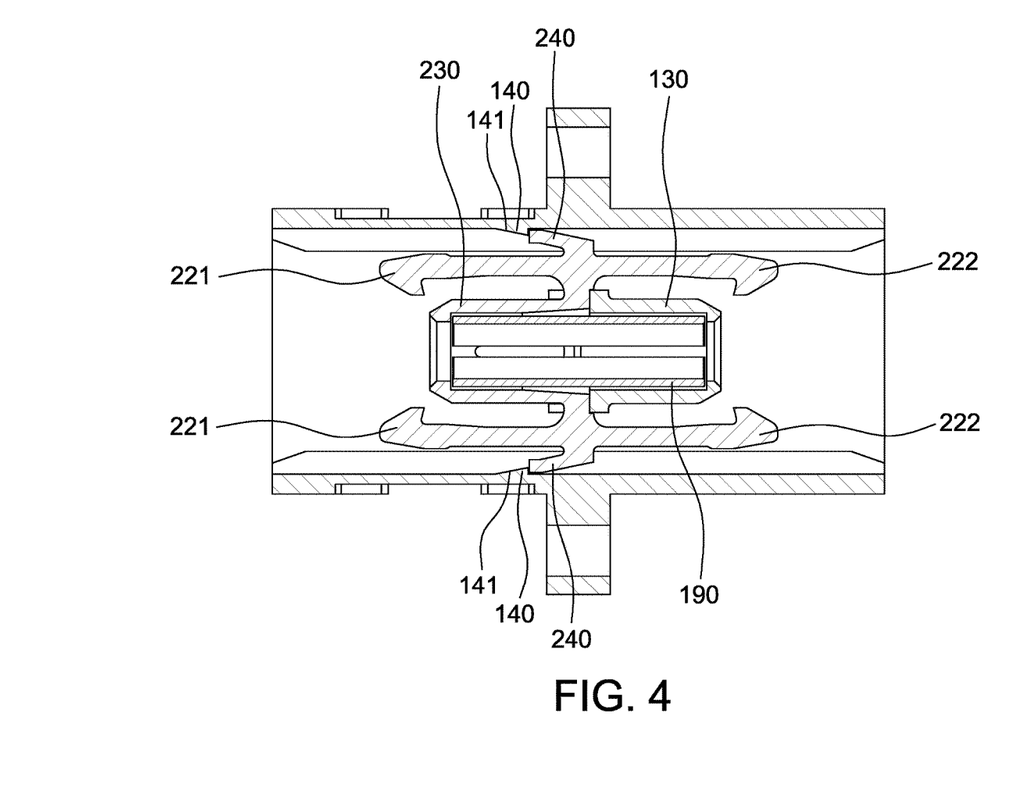
FIG. 4 is a cross-sectional view of the optical fiber adapter of the present disclosure.

Referring again to FIGS. 1, 2 and 3a again, when preparing to assemble the optical fiber adapter of the present disclosure, one half of the alignment sleeve 190 is inserted into the rear end opening of the alignment cylinder 130. Thereafter, the inner housing 200 is inserted into the outer housing 100 and the other half of the alignment sleeve 190 is inserted into the rear end opening of the alignment cylinder 230. FIG. 4 shows the assembled optical fiber adapter of the present disclosure.

According to the optical fiber adapter of the present disclosure, the latching arms 240 of the inner housing 200 will respectively slide on the inclined surfaces 141 of the stop blocks 140 when the inner housing 200 is inserted into the outer housing 100. Referring to FIG. 4, the stop blocks 140 may respectively stop the latching arms 240 from further movement, thereby preventing the inner housing 200 from being pulled out of the outer housing 100 when the inner housing 200 has been assembled in place in the outer housing 100.

According to the optical fiber adapter of the present disclosure, the ferrule of an optical fiber connector along with the optical fiber therein may be inserted into the alignment cylinder 130 and arrive at one end of the alignment sleeve 190. Similarly, the ferrule of another optical fiber connector along with the optical fiber therein may be inserted into the alignment cylinder 230 and arrive at the other end of the alignment sleeve 190. In this manner the ferrules of the two optical fiber connectors are brought to being in contact with each other to allow the optical fibers therein to be butted together.

In conventional optical fiber adapters, the retaining clips in the optical fiber adapters are respectively snapped onto one optical fiber connector so that the two optical fiber connectors may be coupled together. Due to the function of springs in the optical fiber connectors, the long-time coupling of the optical fiber connectors may cause creeps to expand the retaining clips outward. This therefore results in the failure of the retaining clips.

In order to solve the aforementioned problem, the alignment cylinder 230 in the optical fiber adapter of the present disclosure is formed with two oppositely disposed slots 235. According to both simulation and experimental results, the arranged two slots 235 may reduce the stress in the retaining clips 221, 222 when two optical fiber connectors are coupled together with the optical fiber adapter of the present disclosure. Therefore, the latent strain may be effectively reduced and the inner housing 200 may be kept in an un-deformed status for a long time. Since the alignment cylinder 230 is compressed and therefore presses the alignment sleeve 190 therein due to the existence of the slots 235, the interior of the alignment cylinder 230 is thus arranged to gradually become larger toward the opening 232 in order to increase the allowance for the alignment sleeve 190 to reduce the pressure applied thereon.

The formation of the slots 235 in the alignment cylinder 230 may cause the production size of the retaining clips 222 to be difficult to control during the manufacture of the inner housing 200 by an injection molding process. Therefore, the arched bridges 271 and 272 are respectively formed to extend over the ends of the slots 235, thereby preventing the plate 210 from buckling. The U-shaped grooves 261 formed at both ends of the bridge 271 and the U-shaped grooves 262 formed at both ends of the bridge 272 are respectively configured to share the forces applied to the bridges 271 and 272. Generally, the larger the widths of the grooves 261 and 262 are, the smaller the forces applied to the bridges 271 and 272 are. However, the larger widths of the grooves 261, 262 cause the inner housing 200 to have a lower overall rigidity. In addition, since the heights of the pads 251 are greater than that of the bridge 271, the pads 251 may prevent the bridge 271 from directly contacting inner walls of the outer housing 100. Likewise, the pads 252 may also prevent the bridge 272 from directly contacting the inner walls of the outer housing 100.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. An optical fiber adapter, comprising:
  an outer housing having a first alignment cylinder formed therein for receiving a first optical fiber and an alignment sleeve; and
  an inner housing disposed in the outer housing, the inner housing comprising:
    a plate having a front surface, a back surface, a first lateral surface and a second lateral surface, the first lateral surface and second lateral surface being con- nected to the front surface and back surface, wherein the first alignment cylinder is not integrally formed with the plate;
a first pair of retaining clips extending from the front surface of the plate;
a second alignment cylinder extending from the front surface of the plate in a longitudinal direction for receiving a second optical fiber and the alignment sleeve, the second alignment cylinder having a first end and a second end opposing to the first end, the first end of the second alignment cylinder being coupled to the plate, wherein two slots are oppositely disposed and formed in the second alignment cylinder, the two slots pass through the second alignment cylinder and extend in the longitudinal direction to the back surface of the plate; and
two bridges including a first bridge formed on the first lateral surface and a second bridge formed on the second lateral surface, the two bridges respectively extending over the two slots,
wherein two first grooves are formed on the first lateral surface, the first bridge having two opposing ends, the two opposing ends of the first bridge being positioned between the two first grooves.

2. The optical fiber adapter as claimed in claim 1, wherein the two bridges are arched bridges.

3. The optical fiber adapter as claimed in claim 1, wherein two notches are formed under the two bridges to communicate with the two slots respectively.

4. The optical fiber adapter as claimed in claim 1, wherein the two first grooves are U-shaped grooves.

5. The optical fiber adapter as claimed in claim 1, wherein the second alignment cylinder has a first section and a second section, the first section having a uniform interior and the second section having an interior gradually becoming larger toward the plate.

6. The optical fiber adapter as claimed in claim 1, wherein the inner housing further comprising:
a second pair of retaining clips extending from the back surface of the plate.

7. The optical fiber adapter as claimed in claim 1, wherein the inner housing further comprising:
two first pads coupled to the first lateral surface, wherein the two first grooves are positioned between the two first pads.

8. The optical fiber adapter as claimed in claim 7, wherein the first bridge is lower than the two first pads.

9. An optical fiber adapter, comprising:
an outer housing having a first alignment cylinder formed therein for receiving a first optical fiber and an alignment sleeve; and
an inner housing disposed in the outer housing, the inner housing comprising:
a plate having a front surface, a back surface, a first lateral surface and a second lateral surface, the first lateral surface and second lateral surface being connected to the front surface and back surface;
a first pair of retaining clips extending from the front surface of the plate;
a second alignment cylinder extending from the front surface of the plate in a longitudinal direction for receiving a second optical fiber and the alignment sleeve, the second alignment cylinder having a first end and a second end opposing to the first end, the first end of the second alignment cylinder being coupled to the plate, wherein two slots including a first slot and a second slot are oppositely disposed and formed in the second alignment cylinder, the two slots passing through the second alignment cylinder and extending in the longitudinal direction to the back surface of the plate; and
two bridges including a first bridge formed on the first lateral surface and a second bridge formed on the second lateral surface, the two bridges respectively extending over the two slots,
wherein a first notch is formed under the first bridge to communicate with the first slot, the first notch having a lower portion and an upper portion, the upper portion being wider than the lower portion.

10. The optical fiber adapter as claimed in claim 9, wherein the two bridges are arched bridges.

11. The optical fiber adapter as claimed in claim 9, wherein the second alignment cylinder has a first section and a second section, the first section having a uniform interior and the second section having an interior gradually becoming larger toward the plate.

12. The optical fiber adapter as claimed in claim 9, wherein the inner housing further comprising:
a second pair of retaining clips extending from the back surface of the plate.

13. The optical fiber adapter as claimed in claim 9, wherein the inner housing further comprising:
two first pads coupled to the first lateral surface, wherein the first bridge is positioned between the two first pads.

14. The optical fiber adapter as claimed in claim 13, wherein the first bridge is lower than the two first pads.

15. An optical fiber adapter, comprising:
an outer housing having a first alignment cylinder formed therein for receiving a first optical fiber and an alignment sleeve; and
an inner housing disposed in the outer housing, the inner housing comprising:
a plate having a front surface, a back surface, a first lateral surface and a second lateral surface, the first lateral surface and second lateral surface being connected to the front surface and back surface;
a first pair of retaining clips extending from the front surface of the plate;
a second alignment cylinder extending from the front surface of the plate in a longitudinal direction for receiving a second optical fiber and the alignment sleeve, the second alignment cylinder having a first end and a second end opposing to the first end, the first end of the second alignment cylinder being coupled to the plate, wherein two slots are oppositely disposed and formed in the second alignment cylinder, the two slots passing through the second alignment cylinder and extending in the longitudinal direction to the back surface of the plate;
two bridges including a first bridge formed on the first lateral surface and a second bridge formed on the second lateral surface, the two bridges respectively extending over the two slots; and
two first pads coupled to the first lateral surface, wherein the first bridge is positioned between the two first pads.

16. The optical fiber adapter as claimed in claim 15, wherein the first bridge is lower than the two first pads.

17. The optical fiber adapter as claimed in claim 15, wherein the two bridges are arched bridges.

18. The optical fiber adapter as claimed in claim 15, wherein the second alignment cylinder has a first section and a second section, the first section having a uniform interior and the second section having an interior gradually becoming larger toward the plate.

19. The optical fiber adapter as claimed in claim 15, wherein the inner housing further comprising:
   a second pair of retaining clips extending from the back surface of the plate.

\* \* \* \* \*